UNITED STATES PATENT OFFICE.

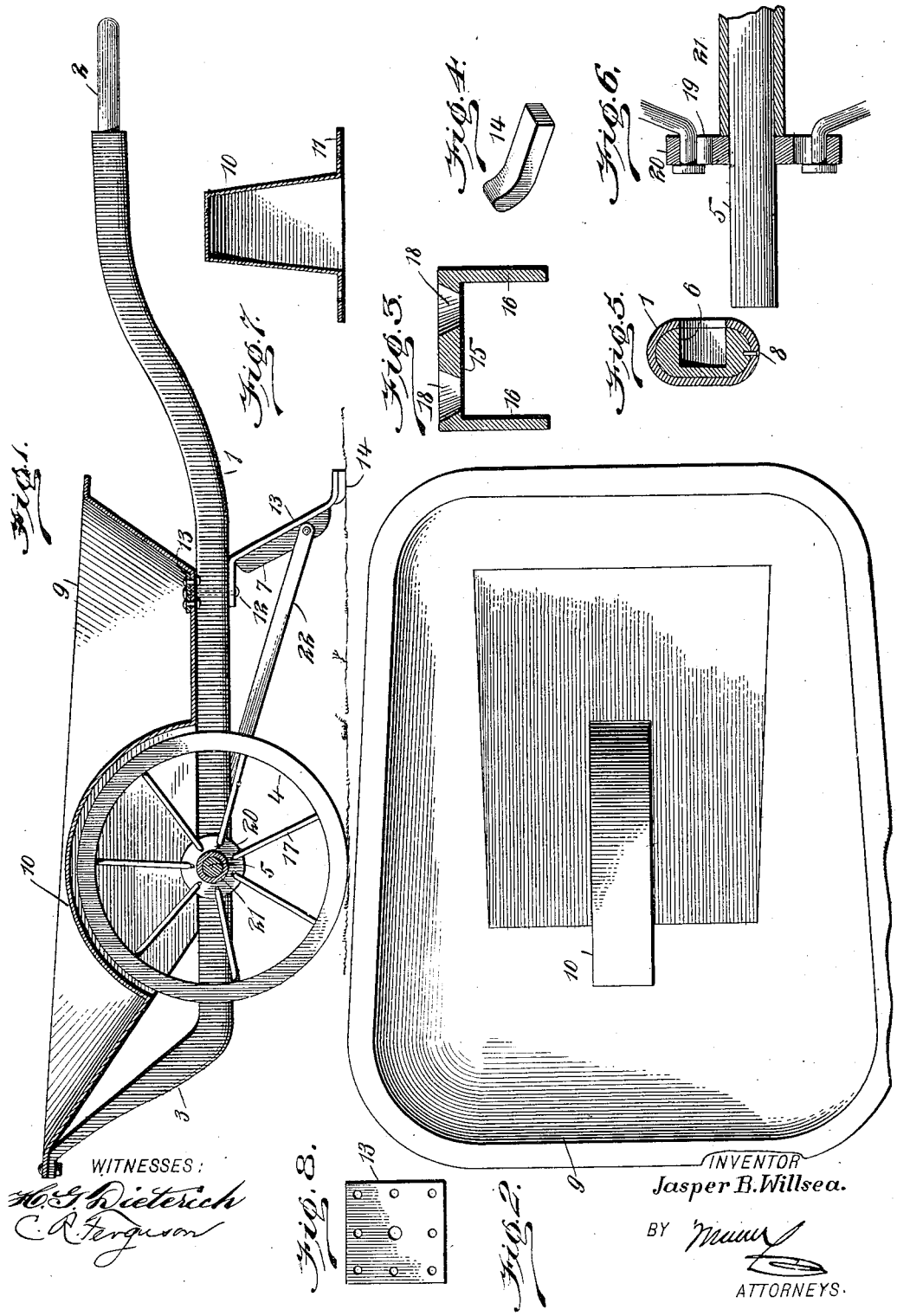

JASPER BARNARD WILLSEA, OF DENVER, COLORADO.

WHEELBARROW.

SPECIFICATION forming part of Letters Patent No. 658,606, dated September 25, 1900.

Application filed April 16, 1900. Serial No. 13,068. (No model.)

*To all whom it may concern:*

Be it known that I, JASPER BARNARD WILLSEA, a citizen of the United States, and a resident of Denver, in the county of Arapahoe and State of Colorado, have invented a new and Improved Wheelbarrow, of which the following is a full, clear, and exact description.

This invention relates to improvements in wheelbarrows; and the object is to provide a wheelbarrow which shall be comparatively light, yet very strong, and having the wheel so arranged with relation to the body or tray that the load upon the handles will be partly counterbalanced, thus relieving considerably the pressure on the handles and lessening the amount of exertion required to push or pull the wheelbarrow with its load.

I will describe a wheelbarrow embodying my invention and then point out the novel features in the appended claims.

Reference is to be had to the accompanying drawings, forming a part of this specification, in which similar numerals of reference indicate corresponding parts in all the figures.

Figure 1 is a longitudinal section of a wheelbarrow embodying my invention. Fig. 2 is a top view of the body or tray. Fig. 3 is a sectional view of a portion of the wheel-rim. Fig. 4 is a perspective view of a shoe employed. Fig. 5 is a sectional view of a bearing for the wheel-axle and shows cross-section of handles. Fig. 6 is a sectional view showing a portion of the axle and hub. Fig. 7 is a sectional view showing a modification in construction of the wheel-hood, and Fig. 8 is a plan view of one of a number of stay-plates employed around bolt-holes in tray.

Referring to the drawings, 1 designates the combined handles and side bars of the wheelbarrow, consisting, preferably, of tubular metal flattened at the sides or made substantially oval for the purpose of increasing the strength in vertical lines. Wooden handpieces 2 may be inserted in the ends of the handles, and the forward ends are inclined upward and forward, as at 3, to form striking-plates when the wheelbarrow is tilted upward to discharge a load and to form supports for the rim or edge of the tray. The wheel 4 has its shaft 5 engaging in bearing-blocks 6, arranged in the side bars or handles 1 between the upwardly-turned portions 3 and the legs 7. These bearing-blocks are held in place by rivets 8 and may be moved backward or forward by using different rivet-holes in the side bars to adjust the weight resting on the handles.

Supported on the side bars or handles is the body or tray 9, consisting of sheet metal stamped to form. Extended upward in this body portion is a hood 10, which covers the upper portion of the wheel 4, as plainly indicated in Fig. 1, thus preventing the contact of the load with the wheel. The hood 10 may be stamped up integral with the body or tray or it may be separate therefrom, having flanges 11, provided with perforations through which bolts may pass, the said bolts passing through the bottom of the body or tray. Also the metal hood may be fitted in this manner to a wooden wheelbarrow.

At the rear portion the body or tray is fastened to the side bars or handles by bolts 12, and to strengthen the tray and the connection between the bolts and the body or tray I employ stay-plates 13, having perforations through which the bolts may pass, these stay-plates being riveted to the bottom of the body or tray, as indicated in Fig. 1. These bolts or rivets 12 also serve to fasten the legs 7 to the side bars or handles.

The upper portions of the legs may be made of soft metal; but preferably the lower end of each leg will be provided with a shoe 14, of hard metal or hardened steel, thus preventing wear. The shoes are curved rearward, thus preventing them from catching on an uneven floor or the like.

The wheel 4 is designed to be very light and yet strong. It consists of an iron or steel rim 15, having inwardly-extended side flanges 16. Spokes 17 pass through openings 18 in the rim 15, and the head portions of the spokes are countersunk in said openings. The inner ends of the spokes engage in radial slots 19, formed in collars 20, attached to the shaft 5. A sleeve 21 is placed between the collars 20 to hold them rigidly spaced apart. I provide the radial slots 19 to facilitate the entrance of the ends of the spokes, and it will be noted that opposite spokes converge to the rim 15, passing to the farther edge of the rim, thus crossing each other. After passing the outer ends of the spokes through the openings 18 they may be tightened by upsetting or riveting the ends.

From the above description it will be obvious that this wheelbarrow may be made very light and yet strong, is particularly adapted for use in smelting-mills, and, further, as the wheel is located between the ends of the body portion the load upon the handles will be partly counterbalanced. When it is desired to dump the load, the handles are to be moved upward, which will turn the forward inclined end of the body or tray downward, allowing the load to drop out. The upwardly-turned portions 3 of the handles or side bars will protect the body or tray from damage, as they will not permit the said body or tray to contact with the floor or ground until most of the load is out of the tray. The barrow can also be dumped sidewise, as usual. Braces 22 are preferably extended from the legs 7 to connection with the handles or side bars.

Having thus described my invention, I claim as new and desire to secure by Letters Patent—

1. A wheelbarrow, comprising handles or side bars having their forward ends curved upward and forward to form striking-bars and to support the edge or flange of the tray, a wheel having its axle-bearings in the side bars between the ends of the body or tray, and a hood in the body or tray extended over the wheel, substantially as specified.

2. A wheelbarrow, comprising tubular handles or side bars, the said handles or side bars being substantially oval in cross-section, the major axis being in a vertical line, a body or tray supported on the side bars, a wheel having its axle-bearings in said side bars between the ends of the body or tray, and a hood in said body or tray extended over the wheel, substantially as specified.

3. A wheelbarrow, comprising handles or side bars, a body portion supported thereon, a wheel having its axle-bearings in the side bars or handles, legs extended from said side bars or handles, and shoes of hardened steel attached to the said legs, the said shoes being curved rearward, substantially as specified.

In testimony whereof I have signed my name to this specification in the presence of two subscribing witnesses.

JASPER BARNARD WILLSEA.

Witnesses:
 FRANK N. DOVE,
 RODELPHUS H. GILMORE.